Aug. 20, 1946.    V. C. KENNEDY    2,406,150
POWER UNIT
Filed May 25, 1942    5 Sheets-Sheet 1
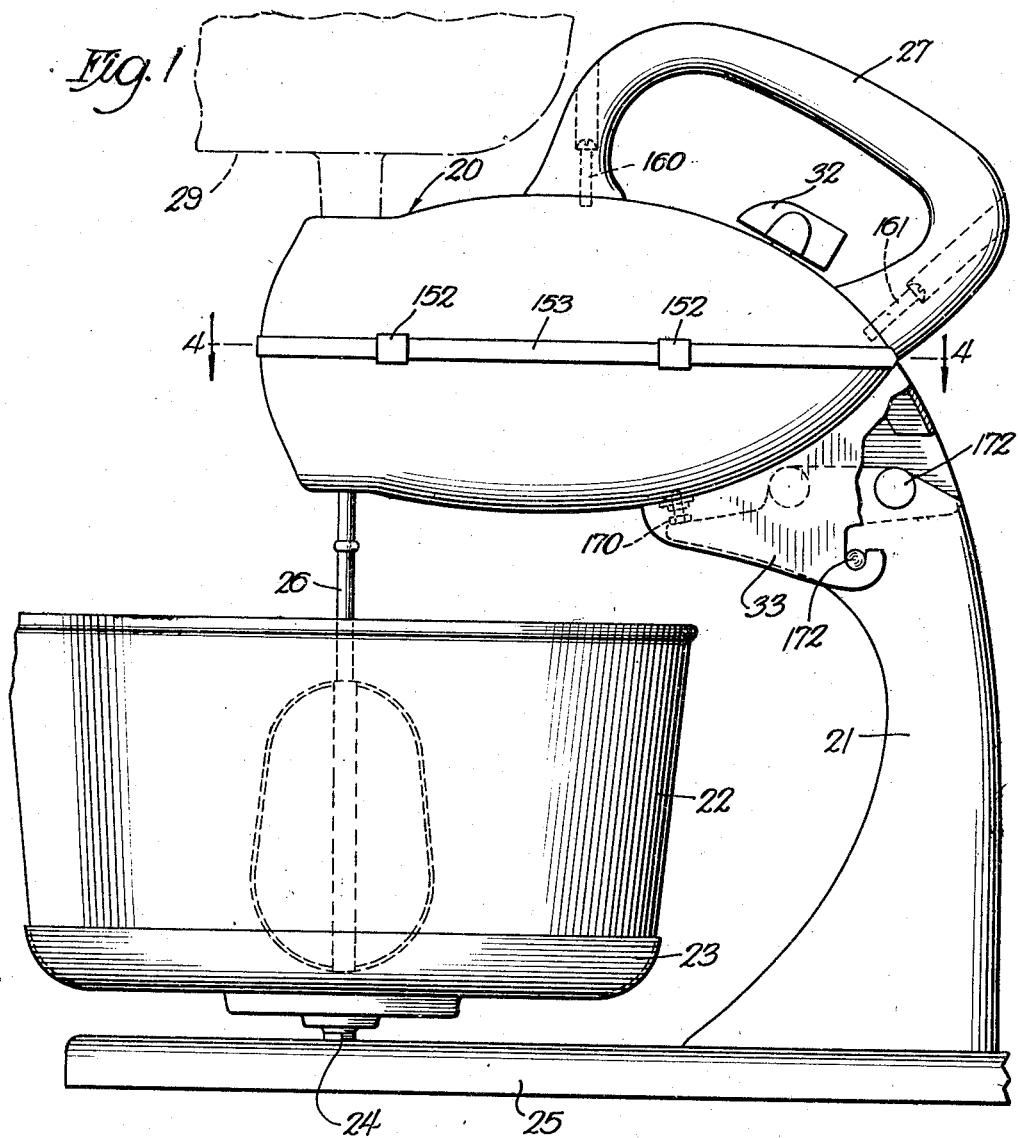
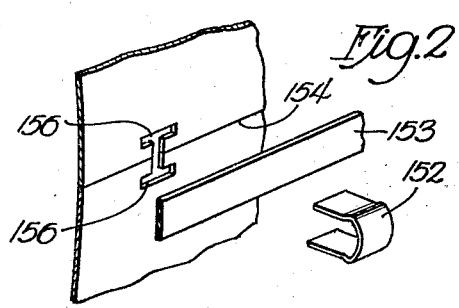
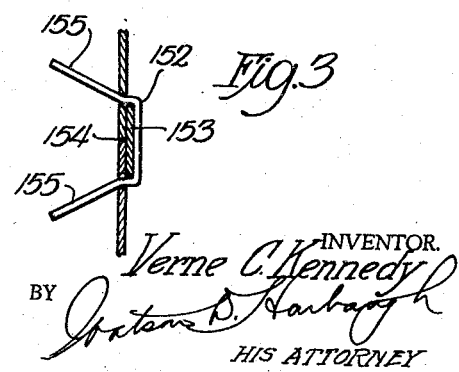
INVENTOR.
Verne C. Kennedy
BY
HIS ATTORNEY

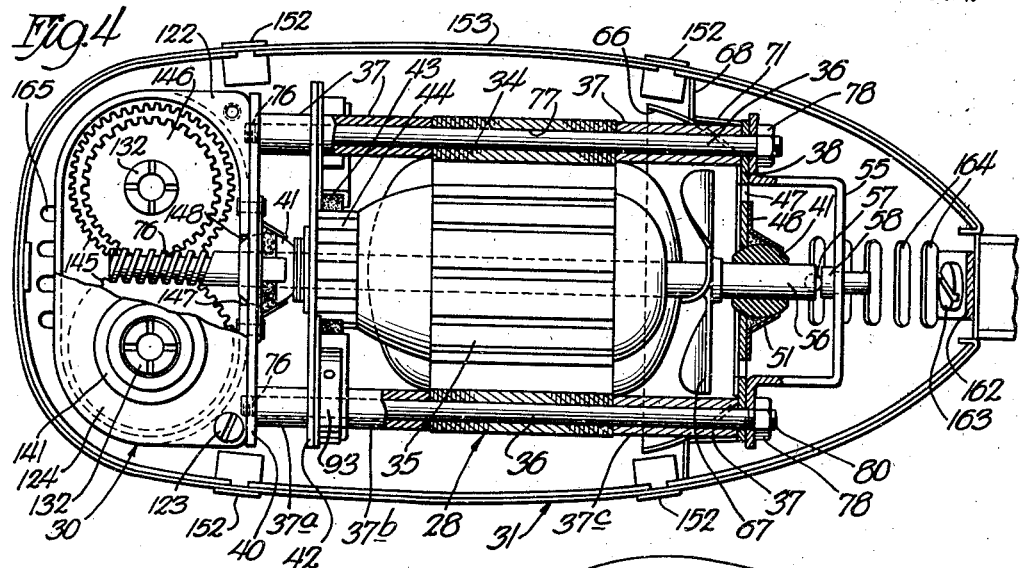
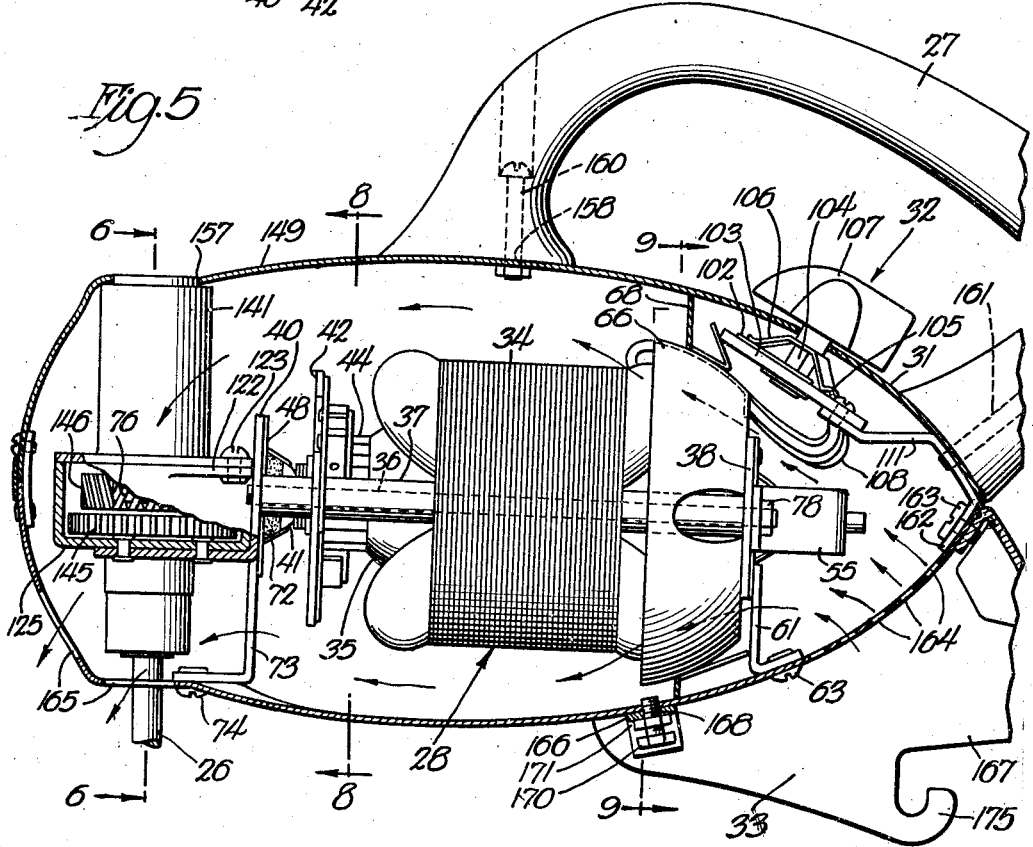

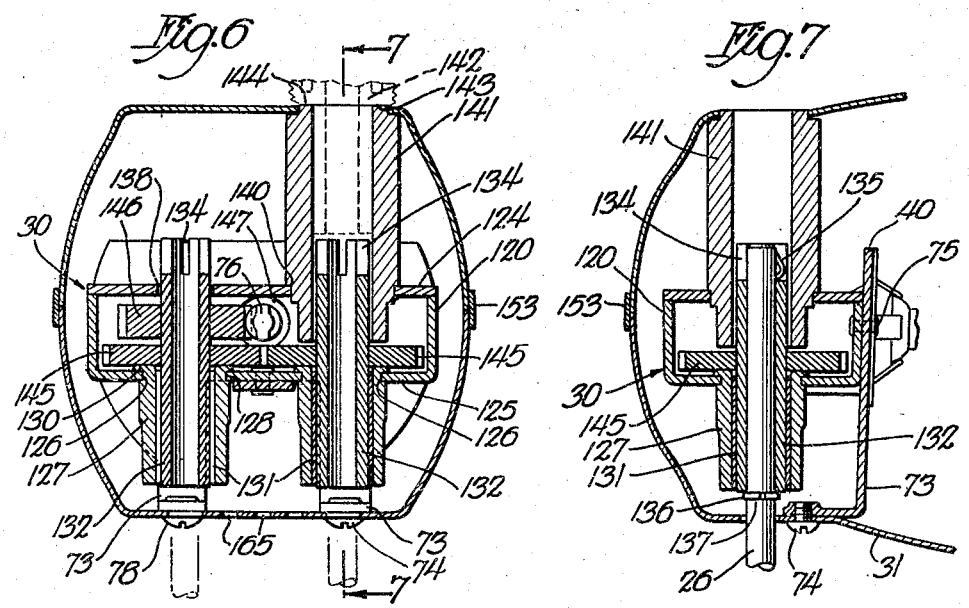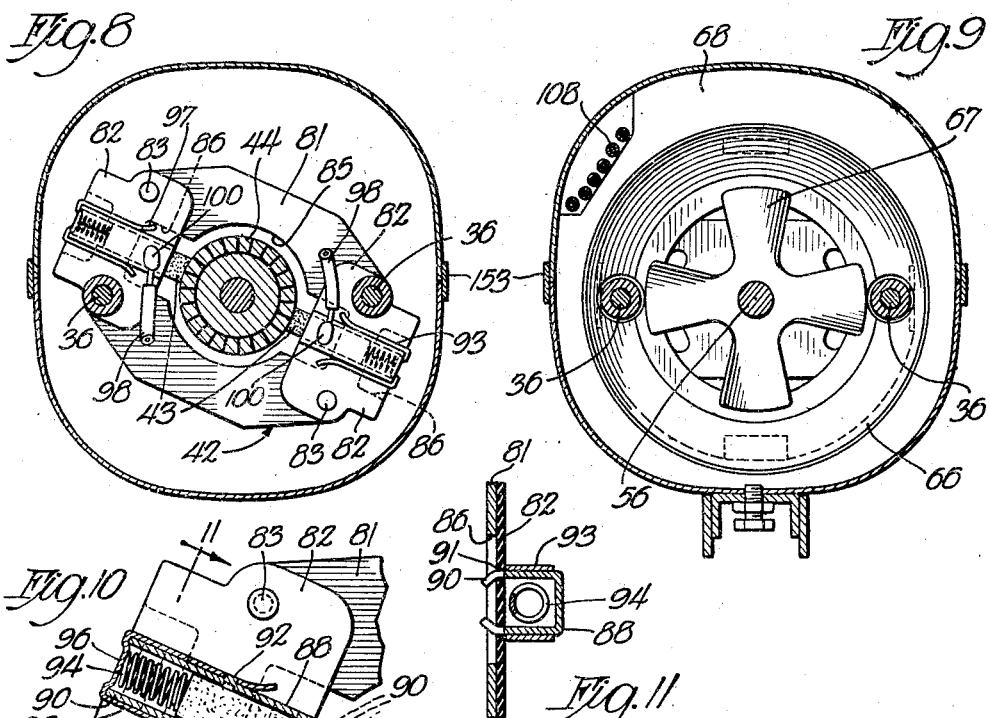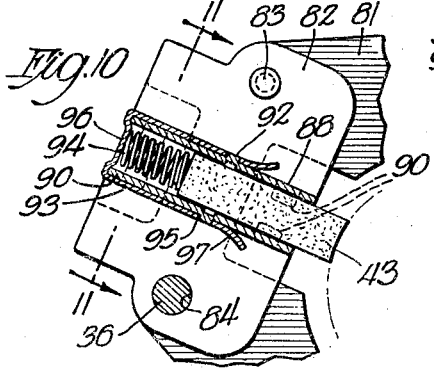

Aug. 20, 1946.   V. C. KENNEDY   2,406,150
POWER UNIT
Filed May 25, 1942   5 Sheets-Sheet 4
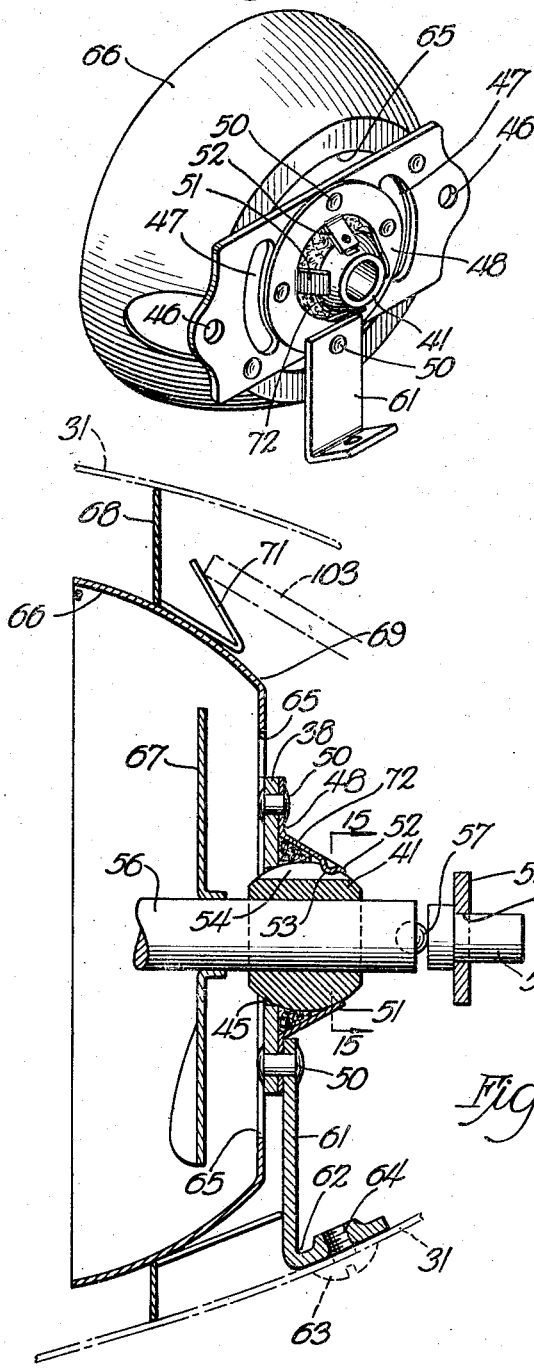
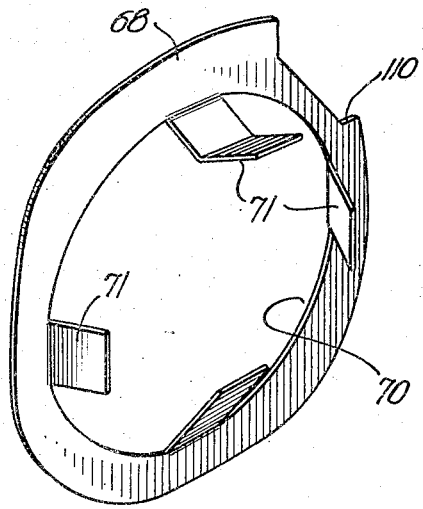
INVENTOR.
Verne C. Kennedy
BY
HIS ATTORNEY Aug. 20, 1946.  V. C. KENNEDY  2,406,150
POWER UNIT
Filed May 25, 1942  5 Sheets-Sheet 5
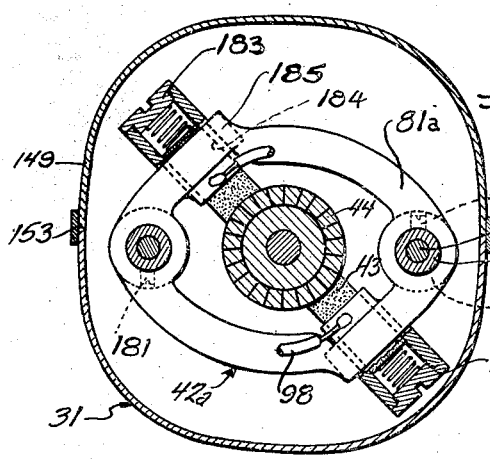
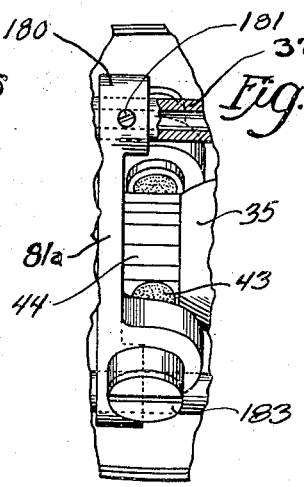
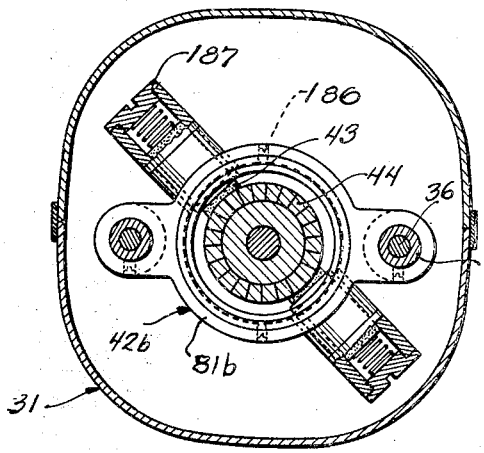
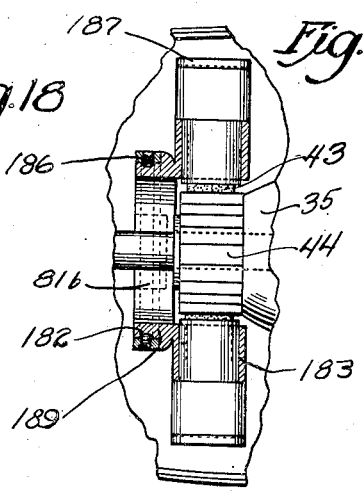
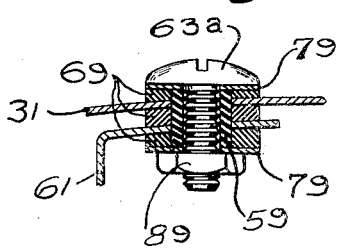
INVENTOR.
Verne C. Kennedy
BY
HIS ATTORNEY Patented Aug. 20, 1946

2,406,150

UNITED STATES PATENT OFFICE 2,406,150

POWER UNIT

Verne C. Kennedy, Evanston, Ill., assignor to A. F. Dormeyer Mfg. Company, a corporation of Illinois Application May 25, 1942, Serial No. 444,314

10 Claims. (Cl. 172—36)

The present invention relates to food mixers and has for one of its objects the provision of a construction wherein all the parts are made preferably of die stampings to reduce the weight of the device and provide a construction which is much stronger for the volume of metal used.

Certain features of the invention are related to and constitute improvements over the construction disclosed in the co-pending application, Serial No. 316,758 of Alfred Strauss and Lee S. Tucker, filed February 4, 1940, for Food mixers, reference to which is hereby made.

Certain other features of the invention relate more particularly to the manner in which a prime mover, such as a fractional horse power motor, for instance, is constructed in a new and novel manner.

One of the objects of the invention is to provide a new and improved method of supporting the armature and stator cores of a prime mover, and further, the provision in connection therewith of a new and improved power unit for food mixers, including preferably a speed reduction transmission formed preferably as a part of the prime mover although the preferred embodiment of the invention illustrated may be used in any application employing an electric motor with or without the transmission shown.

Another object of the invention is to provide an improved food mixer made up of main assembly units such as a shell, transmission and motor, which units in turn are made up of unitary subassemblies capable of being tested and adjusted independently of one another prior to final assembly.

In the conventional construction of food mixers aside from the application referred to, the motor cannot be tested until final assembly of all the parts has been made. In the present construction the motor or the gearing can be test run separately with all parts exposed for adjustment to eliminate roughness of operation before the motor is placed in the assembled device.

Another object of the invention is to provide an improved motor construction which includes an improved bearing and brush assemblies and an improved brush mounting.

A further object of the invention is to support the two magnetic moving flux generating elements in non-rigid or floated suspension.

A further object of the invention is to dispose all torque affected parts of an electric motor upon two rod members which yield transversely of their length.

A further object of the invention is to provide a power unit which can be used in a plurality of styles and designs of food mixers and which can be tested and inventoried without thought as to the food mixer design in which any particular motor is ultimately to be used.

Another object of the invention is to provide a food mixer construction wherein all parts of the power unit are open directly to a bath of circulated air on all sides inside of an outer casing.

Another object of the invention is to provide a food mixer wherein the cooling of the motor is had in a new and improved manner.

Another object of the invention is to provide a new and improved construction and arrangement for mounting the power unit within a finishing shell of a food mixer.

These being among the objects of the invention, other and further objects will become apparent from the drawings, the description relating thereto, and the appended claims.

Referring now to the drawings,

Fig. 1 is a side elevational view of a food mixer embodying the present invention with the view partly cut away to show the manner in which the power unit is mounted upon a support;

Fig. 2 is an exploded view of the elements involved in securing together the upper shell to the lower shell of the power unit housing shown in Fig. 1;

Fig. 3 is an assembled view of the parts shown in Fig. 2;

Fig. 4 is a section taken upon the line 4—4 of Fig. 1;

Fig. 5 is a vertical section taken longitudinally through the power unit in Fig. 1;

Fig. 6 is a section taken upon the line 6—6 of Fig. 5;

Fig. 7 is a section taken upon the line 7—7 of Fig. 6;

Fig. 8 is a section taken upon the line 8—8 of Fig. 5;

Fig. 9 is a section taken upon the line 9—9 of Fig. 5;

Fig. 10 is an enlarged view of the brush holder illustrated in Fig. 8;

Fig. 11 is a section taken upon the line 11—11 of Fig. 10;

Fig. 12 is a perspective view of the unit supporting the rear end of the armature shaft;

Fig. 13 is a perspective view of the baffle associated with the construction shown in Fig. 12 by which the circulation of cooling air in the mixer is controlled;

Fig. 14 is a longitudinal enlarged section taken of the construction shown in Fig. 12 with the baffle shown in Fig. 13 associated therewith;

Fig. 15 is a section taken on the line 15—15 in Fig. 14;

Fig. 16 is a view in part of a modification of the bearing support unit shown in Fig. 8;

Fig. 17 is a side view of the construction shown in Fig. 16;

Fig. 18 is a view similar to Figs. 8 and 16 showing a second modification of the brush carrier;

Fig. 19 is a side view of the construction shown in Fig. 18, and

Fig. 20 is a vertical sectional view of the preferred embodiment by which the prime mover is mounted with respect to the shell.

Referring now to the drawings in further detail, the power unit 20 is shown disposed in its horizontal working position as mounted upon a support 21 to overhang a bowl 22 that rests in a turntable 23. The turntable is pivotatlly mounted as at 24 and the lower end of the support 21 is rigidly secured to a base 25 in a suitable manner. When in its working position, the beaters 26, preferably interdigitating, are disposed in the bowl 22 to agitate the contents thereof. A handle 27 is secured to the power unit as more particularly described herein for purposes of manipulating the power unit on or off the support 21. At its front end the handle 27 is shortened and so contoured as to provide clearance for a juicer bowl shown in phantom 29 to be received upon the power unit when it is desirable to use the power unit as a juicer for citrous fruits or the like.

POWER UNIT

The power unit 20 comprises a prime mover 28, a transmission 30 and a shell 31 shown in Fig. 4, the handle 27, a governor switch 32, the beaters 26 and preferably two downwardly extending parallel flanges 33 spaced from each other to receive the top of the support 21 between them, it being appreciated that a single heavy flange received in a slot could serve also.

*Prime mover*

Briefly stated, the prime mover in turn comprises a stator 34 and a rotor or armature 35 supported with respect to each other in operative position by bolts 36 and spacer sleeves 37 secured to spaced end members 38 and 40. For purposes of convenience, end member 38 will be hereafter referred to as the rear member and the end member 40 referred to as the front member.

Self-aligning armature bearings are mounted in an improved way in the end members and a brush carrier 42 is also carried by the bolts and spacers where the brushes 43 may cooperate in the usual manner with the commutator 44.

As more particularly shown in Figs. 12 and 14, the end member 38 is a stamped plate which has a central opening 45, laterally spaced openings 46 to receive the ends of the bolts 36, and arcuate perforations 47 which allow for the passage of air through the end member.

The bearing 41 has a preferably spherical or rounded contour over a portion of its outer surface, which portion has a greater diameter than the opening 45 so that the bearing can be disposed to rest and be supported in the opening 45 where it is held in place by a stamped retainer 48 riveted to the end member 38 as at 50. The retainer has spring fingers 51 which hold the bearing member 41 in place and one of the spring fingers 52 has a detent 53 therein which engages in a longitudinal slot 54 upon the bearing 41 to prevent relative rotation between the bearing 41 and the end member 38.

A U-shaped bracket 55 more particularly shown in Fig. 4 is preferably secured to the end member 38 by the bolts 36 to encompass the rear end of the armature shaft 56 to provide support for it against end thrust. The end thrust is borne by means of a bearing relationship existing between a steel ball 57 swaged in the end of the shaft 56 and a thrust pin 58 press fitted to the bracket 55 in an opening 60.

In addition to the bearing retainer 48, rivets 50 are also employed to secure a bracket 61 to the end member 38 to provide a support for the weight of the motor at the rear end thereof, this bracket being bent at its outer end as at 62 at a point and at an angle suitable to engage and follow the contour of a supporting element which in this particular case is the casing 31. The casing and bracket may be secured together by a machine screw 63 threaded into the bracket as at 64 although the preferred embodiment, a resilient one, is discussed in connection with Fig. 20.

The rivets 50 also secure to the rear member 38 an air deflector 69 upon the front face of the bracket 38. Air passages 65 are provided through the central portion to admit air from the rear of the end member 38 to the blades of the fan and an outwardly forwardly flared bell-shaped portion 66 is provided as by a die drawing operation to cooperate with the fan 67 upon the armature shaft 56 to force the fan blast forwardly and around the motor parts.

A cardboard member 68, as more particularly shown in Fig. 13, is provided with an opening 70 therein to be received upon the bell-shaped portion 66, and the marginal edges of the cardboard 68 engage the inside of the outer shell to provide a barrier preventing circulation of air around the edge of the bell 66 and back through the opening 65 to the fan 68. Preferably, the cardboard 68 is located in the housing where, mechanically speaking, if it tends to move in one direction, it wedges itself against the bell portion 66, while if it moves in the opposite direction it wedges itself against the outer shell, thereby being held rigidly in place with no further pressure upon it than the air which it controls and its inherent adaptability. The barrier being cardboard, permits assembly line tolerances without rattles in the product.

Around the opening 70 of the cardboard 68, fingers 71 are provided by which initial assembly of the cardboard can be had and the cardboard held in place upon the bell 66 until the shell 31 can be mounted in place.

To the extent that the rear end member has been described herein, regarding the structural characteristics of the self-aligning bearing 41 and the retaining spring fingers 51, the self-aligning bearing in the front end member 40 is identical, like parts being referred to by the same numerals. These bearings are self-lubricating, being made of a porous metal, and a felt wick 72 being provided as held in contact with the bearing by the spring fingers 51. Once the wick is saturated with oil the lubrication of the bearing is maintained for long periods of service.

Referring further to the front end member, as more particularly shown in Fig. 7, a support 73 is formed integrally therewith to serve in the same capacity as the support 61 just described. The support 73 likewise is bent at an angle at its lower end and may engage and be secured to the inner surface of the housing 31 by a screw 74, the preferred form for securement being, however, the resilient one described in connection with Fig. 20.

The front end member 40 preferably carries the transmission 30 to which it is secured rigidly as by rivets 75. The front end of the armature shaft 56 is cut to provide a worm gear 76 upon the end thereof with the diameter of the gear preferably no greater than the diameter of the shaft so that the end is disposed within the transmission housing after insertion through the bearing.

It is preferred that the supports 73 and 61 constitute the sole support of the prime mover and transmission, there preferably being two supports 73 at the front end as more particularly shown in Fig. 6, and one at the back to provide a three point suspension support for the prime mover and transmission.

Referring to Fig. 20 in this connection, the preferred manner of securement is shown wherein a rubber sleeve 59 is received over a bolt 63a which could be used in place of bolts 63 or 74, and three preferably identical rubber washers 69 received thereon alternately with metal parts 61 and 31 and metal washers 79. The metal washers 79 are preferably thin and made of a ductile metal such as aluminum to be deformed around the head of the bolt and the nut 89 when tightened to prevent loosening. This provides a floating and resilient mounting for the motor which allows and accomplishes a working flexure in the motor construction and between the motor and shell as further described later.

Referring again to Fig. 4, it will be seen that the front and rear end members are secured in spaced and supported relationship by rods 36 upon which the stator 34 and the brush holder 42 are mounted.

The rods 36 are threaded as at 76 to the front end member and project rearwardly, parallel with each other, preferably in a horizontal plane. Spacers 37a comprising short sleeves are then slipped on the rods 36 followed by the brush support 42, then a second set of spacers 37b, then the stator 34 of the usual design is slipped in place upon the rods 36 where the rods 36 extend through die punched coincident openings 77 in the laminations making up the stator stack. Thereafter, sleeves 37c are slipped over the rods 36 and the rear end member along with the U-shaped bracket 55 are secured in place by nuts 78. The bolts 36 are threaded as at 80 on their ends to a sufficient length to permit the nuts 78 to be tightened down to provide a firm clamping relationship between the sleeves 37 and the end members.

It will be appreciated that the length of the sleeves are so determined that the parts are disposed in proper working position, namely, the stator 34, where it will cooperate properly with the armature and the brush holder 62 where the brushes 43 cooperate properly with the commutator 44, although, as shown in Figs. 16 to 19, the sleeves 37a and 37b may be one, and the brush carrier slidable thereon for adjustment.

It has been customary heretofore to support the stator of electric motors rigidly in a shell engaging the outer surface of the stator whether bolts were used to hold the stator against longitudinal displacement or not, the theory being quite prevalent in conventional constructions that the relative position of the stator and armature should be rigid.

In the present invention, the sole means of relative support between the stator and armature is the rods 36 and end members, and these rods and end members are preferably made of steel capable of resilient yielding to a limited degree, in the present invention, permitting relative movement among the assembled members to any degree according to design. This latitude can be varied by varying the diameter of the sleeves, larger diameters stiffening the suspension and smaller diameters increasing the relative flexing.

By way of a further understanding of the novel advantages and improved results provided by this construction, such factors are involved as the axes of relative rotation, the dynamic center of balance, flexure, high speeds and vibration. At high speeds, a rotating part, if preserved in operating position, tends to revolve around its center of mass or develop a dynamic balance under speed which might not otherwise exist statically.

In the manufacture of motor armatures unbalance is continually encountered from a manufacturing viewpoint. This unbalance, wherever it exists, creates a strain that results in a stress upon the system.

Where rigidity is present, as in conventional motors, the stress is concentrated and proportionately high, the system sometimes being unable to withstand it, either from a vibration viewpoint or as a mechanical failure item.

In the present invention the stress is at a minimum for any given strains since the whole system distributes the stress widely within the tolerances permitted mechanically between relative rotating parts. The whole system best shapes itself to best resist the stress placed upon it. The armature seeks a dynamically centered working characteristic, influenced somewhat by the centering effect of the balanced magnetic flux, and, through the resilient supports illustrated in Fig. 20, the flexure provided by the rods 36 and end members 38 and 40 combine and the motor in operation gyroscopically and otherwise seeks its harmonic balance of operation. Thus, being freed of low frequency vibrations the system derives a rising speed characteristic resulting in higher speeds and higher torque ratings and furthering these results the resilient mountings permit freedom to the static mass to absorb cooperatively much secondary vibration.

As will be seen, all the parts are exposed and can be contacted directly with detectors while the motor is running to determine the balance of the system and the relative degrees of balance contributed or not contributed by the several parts. In fact, the motor can be run exposed for test purposes as mounted in the shell of the mixer.

Furthermore, this particular construction exposes all working parts for adjustment while the motor is being test run, it being possible where tolerances between the rods 36 and the openings in the end members are not too close, to loosen the nut 78 while the motor is running and shift the rods sufficiently one way or another to establish perfect concentricity between the armature and the field core. Not only this, but the motor is safe to handle, the bell-shaped portion 66 serving as a shield for the fan when one might be handling the prime mover while it is running.

*Brush carrier unit*

Referring to Fig. 8, the brush carrier comprises a sheet metal member 81 of suitable contour having insulating members 82 secured thereto at spaced points by rivets 83 and by the rods 36 through coaxial holes 84. The sheet member is cut out as at 85 to clear the commutator 44 and as at 86 to clear any contacts between the brush supporting elements 88 and the sheet member 81.

As more particularly shown in Fig. 11, the brushes 87 are square and to mount them, the supports are made in the form of rectangular channel members 88 which have marginal ears 90 extending through perforations 91 in the insulating member 82 beyond which the ears 90 are bent over to secure the channel members 88 rigidly in place.

As indicated in Fig. 10, the sides of the channel members 88 are upset as at 92 to provide detents and a U-shaped spring member 93 is slipped over the outer end of the channel member to compress and hold the brush spring 94 in position, openings 95 being provided in the arms of the U-shaped member 73 to interlock with the detents 92 in spring pressed relationship to secure the U-shaped member 93 in place against longitudinal displacement. The base of the U-shaped member is inwardly offset as at 96 to engage within the opening of the U-shaped channel member 88 to prevent relative lateral displacement.

With this construction, the brush and spring assembly can be readily slipped in position and held in place by an inexpensive and simple device, the ends 97 of the U-shaped bracket 93 being bent outward slightly to receive a tool by which they can be sprung free of the detent 92 when, upon occasion, it becomes necessary to remove them.

The channel members 88 are preferably made out of copper or brass to provide good contact and also so that wire leads 98 may be soldered thereto rigidly and permanently as at 100 to place the brushes and commutator in circuit with the windings of the field.

Referring to Figs. 16 to 19 inclusive, two modifications of the brush carrier 42, namely 42a and 42b are shown where is seen in Figs. 16 and 17 the carrier member 81a has bosses 180 apertured to slide snugly upon the sleeve 37d and carrying a lock screw 181 to hold the brushes in adjusted position longitudinally of the armature. In Figs. 18 and 19 a similar carrier is shown except that the member 81b is provided with a circular track 182 receiving a brush holder 183 rotatably therein to locate the brush at the best point of commutation for the load expected of a particular otherwise standard motor, it being remembered one of the objects is to inventory the power unit regardless of ultimate use and then make the final adjustment when the motor is installed.

More particularly in Fig. 16, the brushes may be supported like they are in Fig. 8 by channel members. In Fig. 16, however, another type of brush holder is shown which employs a threaded brush cap 183 on a sleeve swaged or inserted in diametrically aligned openings 184 machined in bosses 185.

In Fig. 18 the flange 189 journalled in the track 182 is externally grooved to be held in place by set screws 186 which, when tightened, further locks the carrier 183 in adjusted position. In Fig. 16 the brushes can be adjusted longitudinally of the armature, different stacks being readily usable with the same brush carrier, and, in Fig. 18, not only is the carrier longitudinally adjustable but brushes are adjustable also for the point of commutation.

Speed governor

The speed of the motor is controlled by a multiposition switch 32 comprising an arcuate contact 102 mounted upon an insulating member 103 upon one side of a shaft 104 secured thereto, and contact buttons 105 on the opposite side of the shaft bridged by a switch member that interconnects the arcuate contact 102 and any one of the buttons 105 depending upon the relative rotation of the shaft operating the bridge, which operation is accomplished by a handle 107. The buttons 105 are connected with leads 108 which tap the field windings of the stator 34 and wherever the switch 101 is located to the rear of the cardboard member 88, the cardboard member, as shown in Fig. 13, is cut away as at 110 to permit the leads 108 to pass therethrough (see Fig. 9) to the field coil.

As shown in Fig. 5, the switch 101 is secured by a bracket 111 to the shell 31. This particular arrangement is suitable for the mixer construction as shown, but where the prime mover 28 is to be used in other applications, it is preferred that the switch be mounted upon a bracket such as 111 which is secured to the rear end member 38 in a manner similar to the bracket 61, which arrangement would facilitate test block running of the prime mover before it is assembled into a device such as a food mixer.

In some instances it might be desirable to employ a centrifugal speed governor, in which case the bracket 55 is preferably employed as a supporting means for one of the contacts of the governor switch, there being sufficient length provided upon the end of the shaft 56 to receive a centrifugal element and a collar (not shown) to operate the switch contacts.

Transmission

Referring again to Figs. 6 and 7, the transmission housing comprises a lower saucer shaped member 120 made of a sheet metal drawn to the shape shown, and preferably round at both ends with outwardly turned lips 122 (Fig. 5) at the rear marginal edges threaded to receive screws 123. The upper face of the member 120 is ground smooth to receive a flat cover 124 thereon in sealed relationship, a metal to metal seal having been found to be sufficient heretofore, although a gasket may be provided if desired. The cover 124 and the bottom 125 of the member 120 are perforated to provide openings which are concentric with each other. Two openings 126 in the bottom receive bearing sleeves 127 therein which have a reduced portion 128 whose upper end is upset outwardly as at 130 to secure the bearing sleeve 127 rigidly in place in grease sealed relationship.

Sleeve bearings 131 are press fitted into the bearing sleeves 127 to journal shafts 132 that receive the upper ends of the beater shaft 26 in drive relationship, the upper end of the beater shafts 132 being cross kerfed as at 134 to receive a radially extending spring key 135 on the beater itself. The spring key releasably supports the shaft against falling out of the shaft as well as providing a drive relationship between the beater and the beater shaft. A spring 136 is disposed in a groove 137 upon the shaft to prevent the beater being inserted into the beater shaft beyond a predetermined limit.

The openings 138 and 140 in the top 124 permit the beater shaft to extend above the transmission housing to provide a long engagement between the beater shaft and the beater for support against lateral strains.

The opening 140 is enlarged to receive a juicer support 141 press fitted into place above the beater shaft 132 where the kerf 134 can receive in drive relationship the shaft (not shown) of the reamer carrying a combination drive and latch spring similar to spring 135 upon the beater. The manner in which the juicer bowl 28 is mounted in the sleeve 141 is indicated in broken lines 142, there being a downwardly facing shoulder upon the juicer bowl support 142 which engages the upper end 144 upon the supporting sleeve 141.

Two interengaging gears 145 are mounted upon the shafts 132 to drive them in opposite directions with another gear 146 upon one of the shafts meshing with the worm 76 upon the armature shaft 56. The rear wall of the housing 120 is apertured as at 147 to receive the forward end of the front self-aligning bearing therein as at 148 where it is in contact with the grease within the transmission housing by which the bearing is kept lubricated, the bearing serving as a closure for the opening, this construction being a novel construction in the particular relationship shown.

*Shell*

The shell 31 is constructed of two die stamped members preferably substantially identical in contour to save die costs and are joined marginally together as shown in Fig. 2 by U-shaped members 152 holding a decorative molding 153 in place over the line of juncture 154 between the shell members and within the legs 155 of the U-shaped member 152 that extend through marginal T-shaped slots 156 stamped in the shell members. The legs 155 are so formed that their resting position is normally divergent with respect to each other, so that after the ends are pressed parallel to be inserted through the slots 156 they will again expand inside the housing when the U-shaped member 152 is pushed home.

The upper shell member 149 is perforated as at 157 to receive the upper end of the juicer support sleeve 141 and, by engagement therewith with or without a resilient washer (not shown) the two are held in mutually supported relation. Further perforations are provided suitable for the securement of the handle 27. In the particular illustration, a perforation at 158 receives a screw 160 that is countersunk into the handle and fastened in place before the upper shell is assembled with the lower shell.

Furthermore, in the particular embodiment illustrated, the switch is accommodated within the confines of the handle where it is protected from abuse or inadvertent damage, same being readily available for operation by one of the fingers of the hand holding the power unit.

The bracket 111 is secured to the inner face of the upper shell 149 by being threaded to receive the inner ends of a bolt 161 as is more particularly shown in Figs. 1 and 5. The lower end 162 of the bracket 111 serves also as a means for securing the two shells together and in combination with the lower shell the die stamped support element 33 is secured to the shell by means of the screw 163.

The lower shell is perforated at the rear as at 164 for the admission of air in a concealed way to the space behind the deflector 64. The lower shell is also provided with outlet openings 165 at the front end to permit escape of the air after it has passed over the motor to cool it. At the front end of the support member 33 a cross member 166 is provided which engages the two side members 167 of the support member 33 and is threaded as at 168 to receive a bolt 170 and a lock nut 171 which cooperates with the upper end of the support 131 to adjustably locate the power unit in any predetermined position to determine the depth the beaters 26 are lowered into the bowl in the working position of the power unit.

As mentioned heretofore, it is preferred to have the motor unit mounted upon the lower shell portion at three points. It will be noticed that the forward points, see bolts 74, are proximate the openings through which the shafts pass through the shell. Where resilient mountings are used, such as shown in Fig. 20, the resilient movement of the transmission and motor at the front is not in any way permitted to allow metal contact between the shell and the beaters in operative position. Thus, the motor and transmission are virtually an isolated harmonic system disposed in a shell without metal to metal contacts, the teaching of the resilient supports set forth in the patent to Alfred Strauss et al. 2,278,186 thus being carried forward for resiliency between the shell and power unit as well as resiliency among the beaters, the center of mass and the support points.

Two longitudinally spaced bosses 172 are provided upon each side of the support 21 at the top to engage the inner faces of the downwardly projecting plates or flanges 167 to prevent the plate from scuffing the support and to align the power unit longitudinally and support same against lateral displacement, the plates 167 otherwise being shaped to follow into the contour of the support 121 in a manner pleasing to the eye. A pin 173 is disposed transversely through the support below the bosses 172 and the lower edge of the plates 167 are so cut in the stamping operation as to provide a hook arrangement 175 which engages the pin 173, the hook being an upwardly opening one at the end of a horizontal slot through which the pin 173 is slid as the power unit is moved rearwardly after the sides 167 have been lowered and guided into place by the bosses 172.

This particular arrangement permits the removal of the power unit from the support in all positions except the working and fully tilted positions. The moment that the power unit leaves its working position in being tilted rearwardly, that moment and from thereon until the power unit is fully tilted back beyond the center of its weight, the power unit may be removed by an upward or forward movement addressed to the handle, whichever is appropriate as will be apparent from a study of the drawings. In this way, a new and improved support arrangement is provided which is readily adjustable under assembly conditions and can be easily manipulated by persons using the mixer who are unskilled mechanically.

Although the description of the present invention has been lodged in terms specific in detail for a better understanding of the embodiment illustrated, it will be readily appreciated that suitable variations will be evident to those skilled in the art from the description made.

Consequently, although a preferred embodiment and several modifications of the invention have been suggested and described herein it will be apparent to those skilled in the art that various and further uses, modifications and changes may be made without departing from the spirit and substance of the invention, the scope of which is commensurate with the appended claims.

What I claim is:

1. In a food mixer a power unit comprising a transmission housing, an armature journalled at one end on the transmission housing, a member spaced from said transmission for journalling the other end of the armature, elongated elements interconnecting said transmission and member in supported relation, a stator core carried by the elongated elements, a brush holder carried by the elongated elements, a shell supporting the transmission and the spaced member at spaced points, a deflector carried by said spaced member, an air baffle in said shell closing the space between the deflector and shell, and air circulating means driven by the armature and disposed within the deflector.

2. In a food mixer a power unit comprising a transmission housing, an armature having one end extending into said housing and journalled in a bearing supported on the housing, a member spaced from said transmission housing and secured thereto by interconnecting pins or the like, means for journalling the other end of the armature upon said member including a self-aligning bearing mounted upon said member, a stator core secured in place by said pins and supported by the pins in operative position with respect to the armature, and a cover for said unit comprising a shell secured with respect to the housing and said member, means for dividing the cover and the two compartments including a deflector for directing air against a stator and armature, air circulating means for moving air from one compartment to the other under the control of said deflector, and said cover having openings in both compartments proximate the transmission in one compartment and beyond the said spaced member in the other compartment.

3. In a food mixer a power unit comprising an armature, a stator core, die formed members bearings carried by said members for journalling said armature, shafts interconnecting said members and supporting said stator, a transmission mounted upon one of said members, brush holder means mounted upon the shafts, and means upon the other of said members for supporting the armature against end thrust, and air circulating means carried by said armature.

4. In a device of the class described, a pair of spaced members interconnected by supporting elements, an armature journalled in the spaced members, a stator supported on the supporting elements, said armature having a commutator disposed at one side of the stator, a third member supported on said elements at a point spaced from the stator and proximate said commutator, diametrically arranged insulating elements on the third member, U-shaped channel elements having detents on their sides secured exclusively upon the elements to support brushes therein, and a U-shaped spring element received in supported relation on said channel elements in engagement with said detents for closing the outer end of said channel members.

5. In an electric motor having a rotor and a stator, two unitary assemblies journalling the rotor, rods or the like interconnecting the assemblies in supported relation and supporting the weight of the stator, a carrier slidable upon the rods including means for locking the carrier in place upon the rods, and a brush holder and means for rotating the brush holder with respect to the carrier to place the brushes at the best point of commutation.

6. A motor construction including two end members, self aligning bearings on the end members journalling an armature, a stator core, a pair of resilient rods secured at opposite ends to the end members at substantially diametrically spaced points on each of the members and constituting the sole support of the stator core on the end members in torque absorbing relationship with respect to the armature, said rods being capable of flexing appreciably under the relative torque developed between the armature and stator core.

7. A food mixer power unit comprising a transmission housing, an armture journalled at one end with respect to the transmission housing, a member spaced from said transmission housing for journalling the other end of the armature, a stator core cooperating with the armature, a pair of resilient rods or the like interconnecting said transmission housing and member in supported relationship and carrying said stator core, said rods constituting the sole support of the stator core and being capable of flexing appreciably under the relative torque developed between the armature and the stator core, a cover enclosing the transmission housing, the armature and stator core including a shell, and means for supporting the transmission housing and said member at spaced points in said shell.

8. In a food mixer power unit the combination of a shell, an armature in the shell, a stator core in the shell, spaced members mounted in the shell each directly to the shell at spaced points, means for supporting the stator core upon the spaced members including resilient elements carried by the spaced members and constituting the sole support for said stator core, a transmission comprising a housing secured to one of the members and driven from the armature, vertically disposed bearings in said housing, power delivering shafts journalled in the bearings and accessible through openings in the shell, gear means for driving the shafts from the armature by which the torque of the armature is delivered to the power delivering shafts, said resilient elements being capable of flexing appreciably under the relative torque existing between the armature and stator core.

9. A motor construction comprising supporting means, two spaced members characterized by being disposed substantially parallel with each other and each held in supported relation upon the supporting means, an armature supported in journalled relationship between and upon the members, a stator core, and resilient means interconnecting said members and constituting the sole support for the stator core, said resilient means being capable of flexing appreciably under the relative torque developed between the armature and the stator core.

10. In a power unit comprising two spaced end mmbers, elongated resilient elements interconnecting the end members in supported relationship, bearings carried by the end members, an armature journalled in the bearings; a stator core carried solely by the elongated elements, said elements being capable of flexing appreciably under the relative torque developed between the armature and the stator core, a covering for said unit comprising a shell enclosing the stator core, the armature and said elements, means for mounting the covering on the unit with space between the shell and stator core, and air circulating means driven by the armature including an element for directing cooling air over the stator core between the core and the shell.

VERNE C. KENNEDY.